3,107,116
HOUSE TRAILER
Stanley B. Meaker, 362 E. Howell Road, Oxnard, Calif.
Filed Oct. 9, 1961, Ser. No. 143,851
2 Claims. (Cl. 296—23)

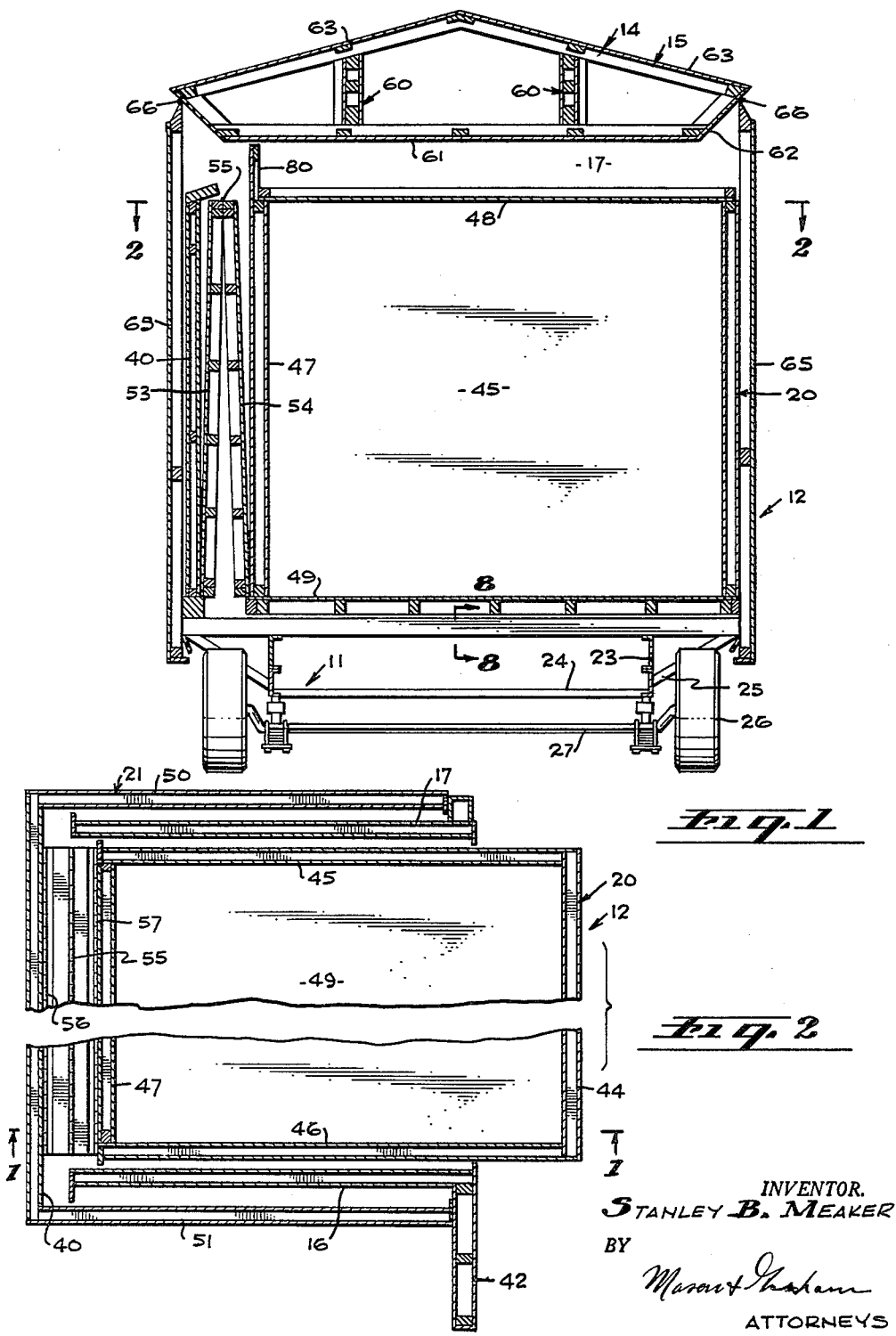

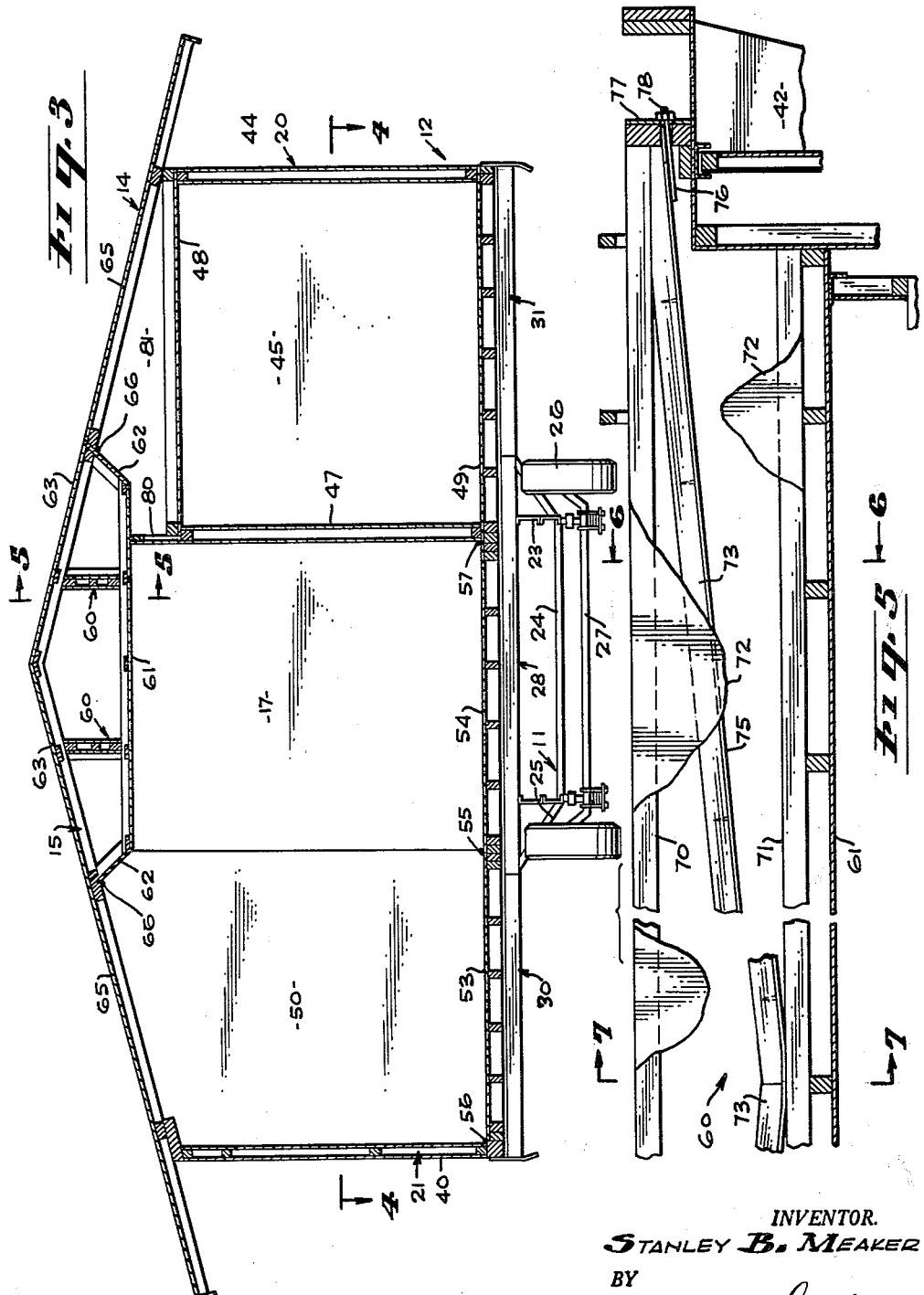

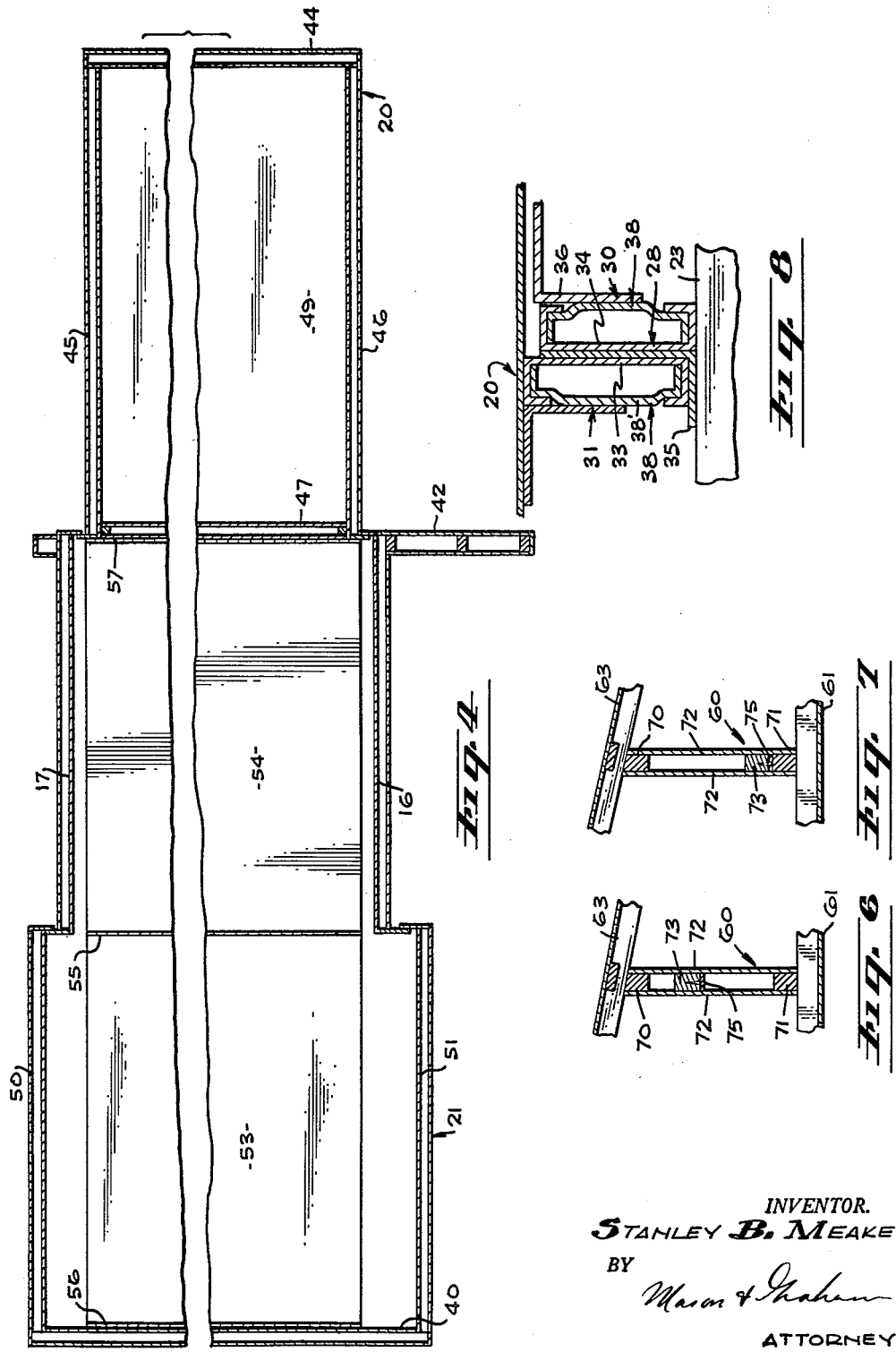

This invention has to do with house trailers or mobile homes and particularly relates to improvements in laterally expansible and contractible house trailers.

An object of the invention is to provide a new and improved laterally expansible house trailer which may be towed by a motor vehicle over highways in a contracted position and which can be expanded at the dwelling site, to more than double its contracted width and thereby afford maximum floor space and interior dwelling space.

A particular object is to provide a laterally expansible house trailer which embodies a novel contruction enabling the trailer, when expanded, to more nearly resemble or approximate the outward appearance of a conventional residence or home than other house trailers with which I am familiar.

Another object of the invention is to provide a novel collapsible roof construction which can be expanded or extended to overlie and provide an overhang beyond the laterally expanded body sections of the trailer body.

A further object is to provide a new and improved beam structure providing a high degree of strength in proportion to the weight thereof and to provide a novel frame construction embodying the same.

A still further object is to provide a novel sliding track construction for supporting the main trailer body on the trailer chassis and permitting the expansion and contraction of the body.

These and other objects will be apparent from the drawings and the following description. Referring to the drawings:

FIG. 1 is a cross sectional elevational view through a house trailer embodying the invention, shown in contracted position, the section being designated by line 1—1 of FIG. 2;

FIG. 2 is a fragmentary sectional plan view on line 2—2 of FIG. 1, but with the depending roof sections removed;

FIG. 3 is a view similar to FIG. 1 on a reduced scale showing the trailer in expanded position;

FIG. 4 is a fragmentary sectional plan view on line 4—4 of FIG. 3;

FIG. 5 is a fragmentary sectional view on line 5—5 of FIG. 3, but on a larger scale;

FIGS. 6 and 7 are fragmentary sectional views on lines 6—6 and 7—7, respectively, of FIG. 5; and FIG. 8 is a cross sectional view on line 8—8 of FIG. 1, but on a larger scale and fragmentary in character.

More particularly describing the invention, in general the trailer comprises a chassis 11, a body 12 which is expansible and contractible laterally, and a roof 14. A main roof structure 15 extends centrally from front to rear of the trailer and is stationarily mounted upon end walls 16 and 17 of the body which are fixed to the chassis in any suitable manner. The body includes two movable sections, 20 and 21 respectively, which telescope with respect to the end walls 16 and 17 and the roof structure 15, being movable from a contracted or telescoped position shown in FIGS. 1 and 2 to an expanded position as shown in FIGS. 3 and 4.

The chassis includes a main frame having at least two laterally spaced longitudinal members 23, suitable cross members 24 therebetween, and diagonal braces 25. Wheels 26 of an appropriate type are carried on one or more axles 27. The frame also includes a plurality of stationary track members 28 which are spaced apart longitudinally of frame members 23 and upon which are mounted movable track sections 30 and 31 which support the movable sections 21 and 20 of the body, respectively. The stationary track members 28 are each formed of two channels 33 and 34 disposed back to back with an L member 35 therebetween and extending under channel 33 so as to elevate it with respect to the other. The three parts of the stationary track 28 may be welded together. The members 30 and 31 each comprise an angle beam 36 which is welded to an offset central portion 38' of a channel 38. The channel 38 of each movable track element is slidable in one side of the stationary track member. With the two members 30 and 31 at different elevations, members 30 which support the movable section 21 of the body will freely move beneath the floor of the section 20 when the parts are telescoped to contracted position. In this connection it will be noted that the outer wall 40 of the section 21 rests upon the outer ends of the track sections 30.

As previously indicated the front wall 16 and rear wall 17 of the trailer are stationary and preferably an auxiliary, forwardly projecting stationary upright wall 42 is provided normal to and in front of the front end wall 16.

The body includes the two laterally movable sections 20 and 21. The section 20 is telescopically received within the stationary end walls 16 and 17 and beneath the roof structure 15, having an outer wall 44, end walls 45 and 46, an inner wall 47, a ceiling 48, and floor 49. The inner wall may be discontinuous, having openings or the like therethrough for doors or larger openings to permit a room to extend the full width of the trailer. The section 21 has end walls 50 and 51 and the outer wall 40.

As previously indicated, the movable section 20 of the body has a fixed floor section 49. The remainder of the floor of the body is provided by hingedly mounted sections 53 and 54. These are pivotally connected at their adjacent edges by a hinge means 55 and pivotally mounted at their other edges by hinges 56 and 57 respectively. When the trailer is contracted the floor sections fold upwardly or jackknife, as best shown in FIG. 1.

The roof structure 15 includes two longitudinally extending beam structures 60 beneath which is a ceiling 61 extending approximately one-third the width of the trailer as expanded and having upwardly and outwardly inclined side walls 62. Above the beam structures is the roof proper which comprises the two inclined roof sections 63 which extend only to the line at which the side walls 62 of the ceiling intersect the roof. Beyond this line on each side of the central roof structure is a roof element 65 which is hingedly mounted at 66. When the trailer is contracted the roof elements hang vertically at the sides of the vehicle beyond the outer walls of the two movable sections of the body, as best shown in FIG. 1. When the trailer is expanded the roof elements 65 are disposed or supported upon the outer walls of the movable sections and thus form a continuation of the central roof sections 63. During telescoping movement of the body sections, the roof sections 65 may be propped up temporarily by suitable posts (not shown).

The ceiling 61, roof sections 63 and side walls 62 define a main attic space.

One of the features of the invention is the construction of the roof beam structures 60. These are made up of relatively lightweight material and yet possess unusual strength in proportion to their weight. Each beam structure comprises upper and lower stringers or beams 70 and 71, respectively, of wood, and plywood facing sheets on each side, designated 72. Intermediate the top and bottom beams is an angularly disposed beam comprising two wooden members 73 inclined downwardly from their outer ends at the upper beam 70 to the lower beam 71 at the center. Beneath these two inclined beam elements I provide a strap 75 of steel the ends of which may be provided with a threaded rod 76 at each end so that it can be secured under tension beyond the plate 77 by a suitable nut 78. If desired, a cable may be used in place of the strap.

Another feature of the invention is the provision of the ceiling section 48 over and as part of the movable section 20 which cooperates with the roof 14 and an auxiliary wall section 80 to provide a space 81 in the expanded trailer in the nature of an attic to act as storage space and as a housing space for cooling or heating equipment. If desired the auxiliary wall 80 may be fitted with a plurality of rollers or casters on its upper surface to make rolling contact with the ceiling section 61.

Although I have illustrated and described preferred forms of my invention, I contemplate that various changes and modifications can be made therein without departing from the invention, the scope of which is indicated by the following claims.

I claim:

1. In a laterally expansible and contractible house trailer, a chassis, a front wall fixedly mounted on said chassis, a rear wall fixedly mounted on said chassis, beams mounted on said walls and extending longitudinally of the trailer, a main roof mounted on top of said beams, a main ceiling secured beneath said beams, side walls connecting said ceiling and roof and cooperating therewith to form an attic space, a laterally movable first body section telescopically receivable within the space between said front wall, rear wall and roof and movable laterally on said chassis to an extended position projecting laterally beyond said walls and roof, a laterally, movable second body section having end walls telescopically receiving said front and rear walls and having a collapsible floor section, said second body section being movable to an extended position projecting laterally beyond said walls and roof, and an auxiliary roof section hingedly mounted at each lateral margin of said main roof, said roof sections depending vertically outside said first and second body sections when said body sections are fully telescoped and extending laterally of the main roof over said body sections when the same are extended.

2. The house trailer set forth in claim 1 in which said first body section is provided with a ceiling spaced below said main ceiling and, in conjunction with the auxiliary roof section thereabove, defining a space from end to end of the trailer when said first body section is extended, and in which said second body section is ceilingless and the auxiliary roof section thereabove serves as a ceiling therefor when said second section is extended.

References Cited in the file of this patent

UNITED STATES PATENTS

| | | |
|---|---|---|
| 2,006,477 | Pendry | July 2, 1935 |
| 2,606,057 | Johnson | Aug. 5, 1952 |
| 2,624,430 | Macomber | Jan. 6, 1953 |
| 2,634,462 | Graven | Apr. 14, 1953 |
| 2,864,471 | Williams | Dec. 16, 1958 |
| 2,901,282 | Meaker | Aug. 25, 1959 |
| 2,902,312 | Ferrera | Sept. 1, 1959 |